Oct. 22, 1940.     H. M. CARRYL     2,218,602
REFRIGERATING APPARATUS
Filed Aug. 26, 1935     4 Sheets-Sheet 1

Inventor
Harry M. Carryl

Oct. 22, 1940.  H. M. CARRYL  2,218,602

REFRIGERATING APPARATUS

Filed Aug. 26, 1935　　4 Sheets-Sheet 4

Inventor
Harry M. Carryl

Patented Oct. 22, 1940

2,218,602

UNITED STATES PATENT OFFICE 2,218,602

REFRIGERATING APPARATUS

Harry M. Carryl, Washington, D. C.

Application August 26, 1935, Serial No. 37,996

14 Claims. (Cl. 62—99)

The invention relates to improvements in refrigerating apparatus and more particularly to cooling cabinets for use in connection with the heat transfer in refrigerating apparatus.

One object of my invention is to provide a cooling cabinet having means for transferring heat from the contents of a vessel directly by solid conduction from said contents to the refrigerant.

A second object of my invention is to provide a device that is easily constructed and without maintenance troubles in situations where it is undesirable to have unconfined liquids.

A third object of my invention is to provide a thermal cabinet with certain mechanical refinements to more adequately cooperate with specific details of my evaporator cooling contact plates.

A fourth object of my invention is to provide a cooling cabinet that is easy to keep in a sanitary condition.

A fifth object of my invention is to provide a method of applying more than one temperature to the vessels to be cooled.

Heretofore, it has been customary to transfer heat from the contents of a closed vessel to refrigerating media thru a gas or liquid interposed between the containing vessel and the refrigerating medium. Such types of apparatus have been found to be more or less unsatisfactory because of slow transfer of heat from the containing vessel thru the secondary medium to the refrigerant; and furthermore, when liquids, such as brine or sweet water, have been used for the conducting medium they are splattered around and foreign matter may be spilled in the brine or sweet water, which contribute toward an unsanitary condition surrounding the cooling unit and also cause rapid deterioration in the structure of the cooling unit and cabinet.

The cooling cabinet comprises a thermally insulated chest 2 of generally standard construction, excepting in certain particulars which are part of my invention. Since this cooling cabinet is to be used with vessels of such size that they are heavy and awkward to handle when containing liquid, I have limited the lift that is necessary on these vessels by attaching a portion of the front of the box to a hinged lid 4. This portion of the front wall, or lip which is attached to the lid is shown at 6. The lower portion or sill is designated as 7. This sill is located on a level with or slightly above the top of the apparatus contained in the box so that the front wall will act as a protection to the enclosed mechanism. To allow the lid to swing relatively to the lower portion of the box in such a structure, I have shown a generally triangular section of the wall attached to the lid, as at 8. It is to be understood that the lid is gasketed relative to the lower portion of the box in an old and well known manner. A handle 9 is provided for lifting the lid.

Figure 1:
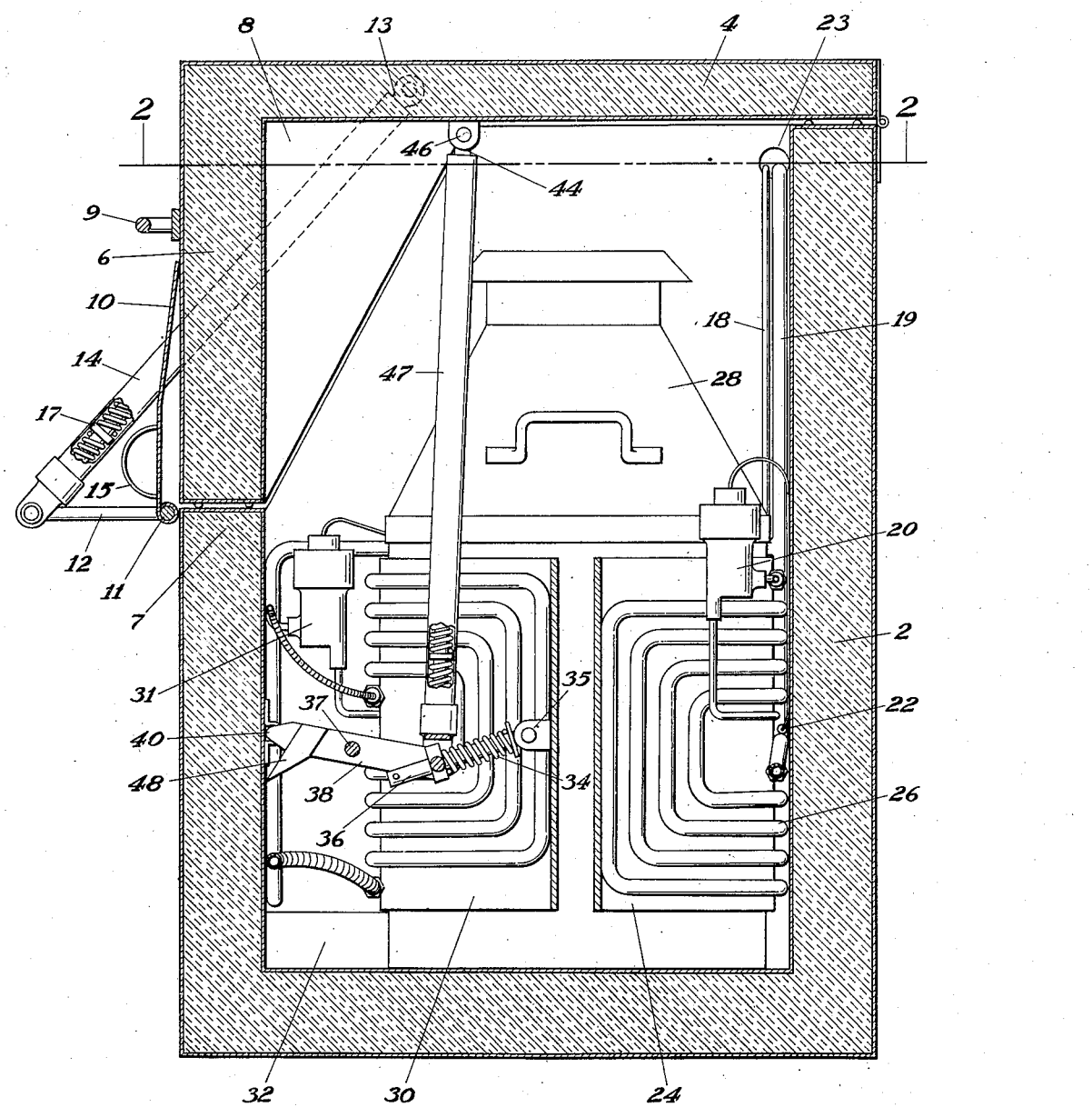
Figure 1 is a side elevational sectional view of the cooling unit taken along the section line 1—1 of Figure 2.
Figure 3:
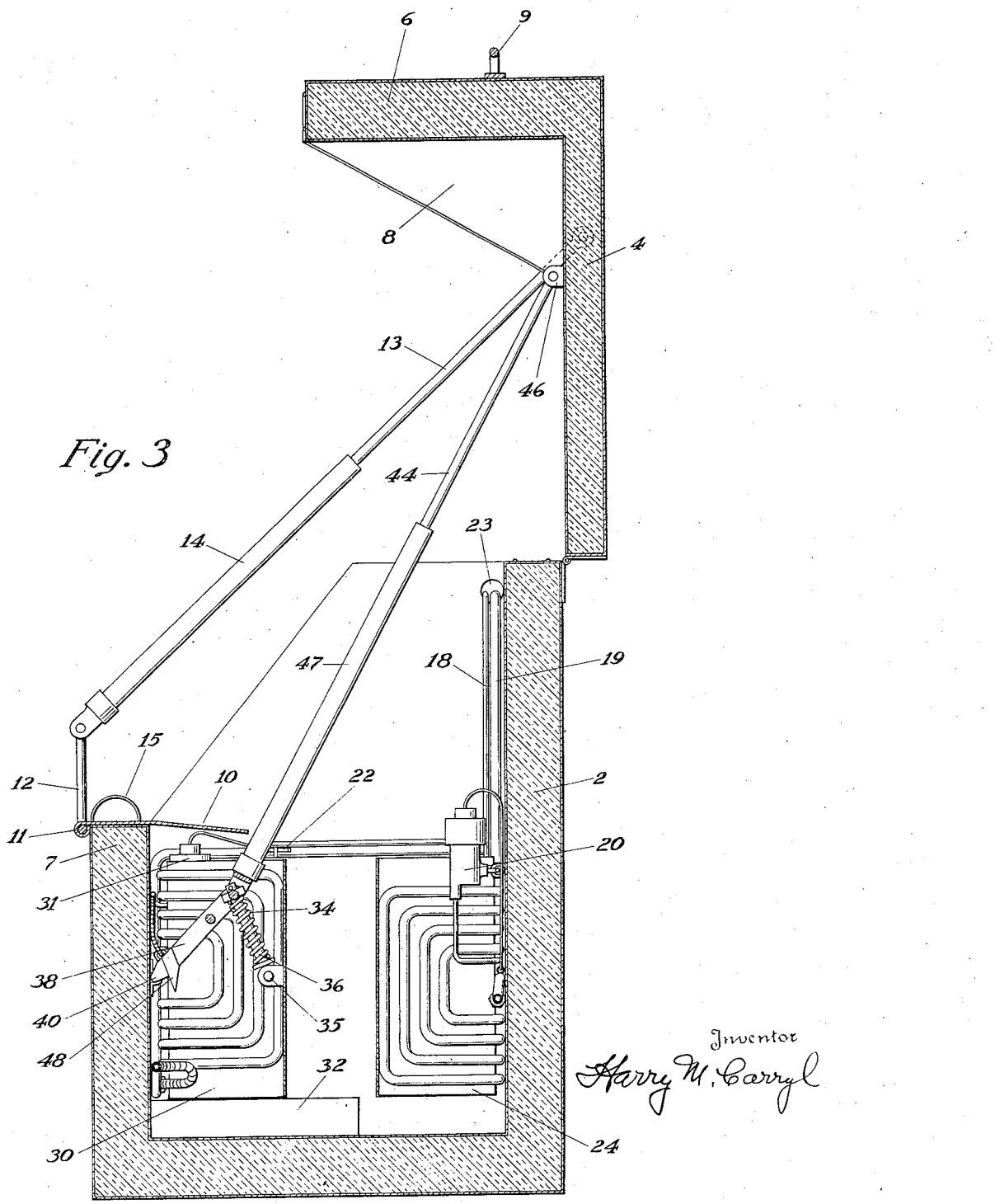
Figure 3 is a sectional view similar to Figure 1, except that the lid of the cabinet is raised, the movable cooling contact member retracted and the milk can withdrawn.
Figure 4:
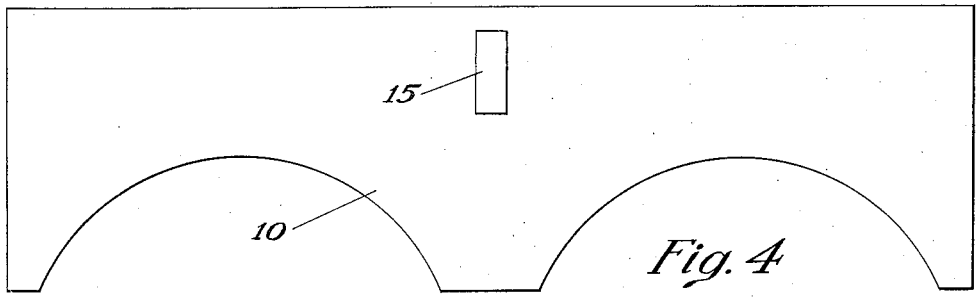
Figure 4 is a detached view of the protecting apron and can rest.

The protecting apron and can rest 10 moves automatically into the cabinet when the lid is raised, as shown in Figure 3. This apron and can rest 10 extends across the front of the cabinet being attached to the front of the sill 7. On the edge that turns over into the cabinet is cut out a semi-circular piece, or pieces, as the case may be, to provide a guide for the vessel or vessels to be cooled when they are being inserted into the cabinet. The protecting apron and can rest 10 is pivoted to the sill 7 at the point 11. Rigid with the apron 10 is the rod 12 extending outside the cabinet. Pivoted to the outside edge of the lid 4 is a rod 13 the free end of which extends into a sleeve 14 which is pivoted to the rod 12. Appropriate washers on the rod 13 inside the sleeve 14 will provide mechanical connection with lost motion between the rod 13 and sleeve 14. Suitable springs shown at point 17 also inside the sleeve will furnish cushioning means. It will be evident that as the lid 4 is lifted the rod 13 acting thru the sleeve 14 will rotate the rod 12 and apron 10 over the sill 7 so that it will rest in a horizontal position thereon. In this position the apron 10 will not only act as a protection for any apparatus in the cabinet over which vessels are to be lifted but also as a rest on which these vessels may be steadied during the operation of inserting them in the cabinet. As the lid 4 is lowered the apron will move counter clockwise (Figure 3) and to a vertical position outside the cabinet as shown in Figure 1 before the lip 6 engages the sill 7. The apron and can rest 10 is provided with a handle 15 for manual operation if desired. The plan view shape of this protecting apron and can rest 10 is shown in Figure 4.

At 16 is shown a fixed evaporator unit or expansion unit of special design attached to the thermal cabinet 2 and adapted to be supplied with liquid refrigerant from a compressor-condenser structure, not shown, thru conduit 18 (Figure 2) by way of thermostatically controlled expansion valves 20 and 31, or any other suitable means for admitting refrigerant to the evaporator. The valve 31 may be set at any temperature either the same as or different from that of valve 20. In the case when the two valves are set at different temperatures a temperature gradient is set up across the space between the two contact plates which results in an agitation of the liquid being cooled. This is inducive to quicker and more efficient cooling. If desired the valve 31 may be eliminated and both evaporator tubes be connected to the valve 20 to be controlled thereby. This would be desirable where the device is to be used for freezing only. In my preferred form I use thermostatic controls set at predetermined temperatures responding to temperatures in the exit tubes 19 of the evaporators by bulbs, or other thermo element attached at such points; i. e., at 22. This predetermined temperature may be either a cooling or a freezing temperature. Both conduit distributing tubes enter the cabinet at 23.

Figure 2:
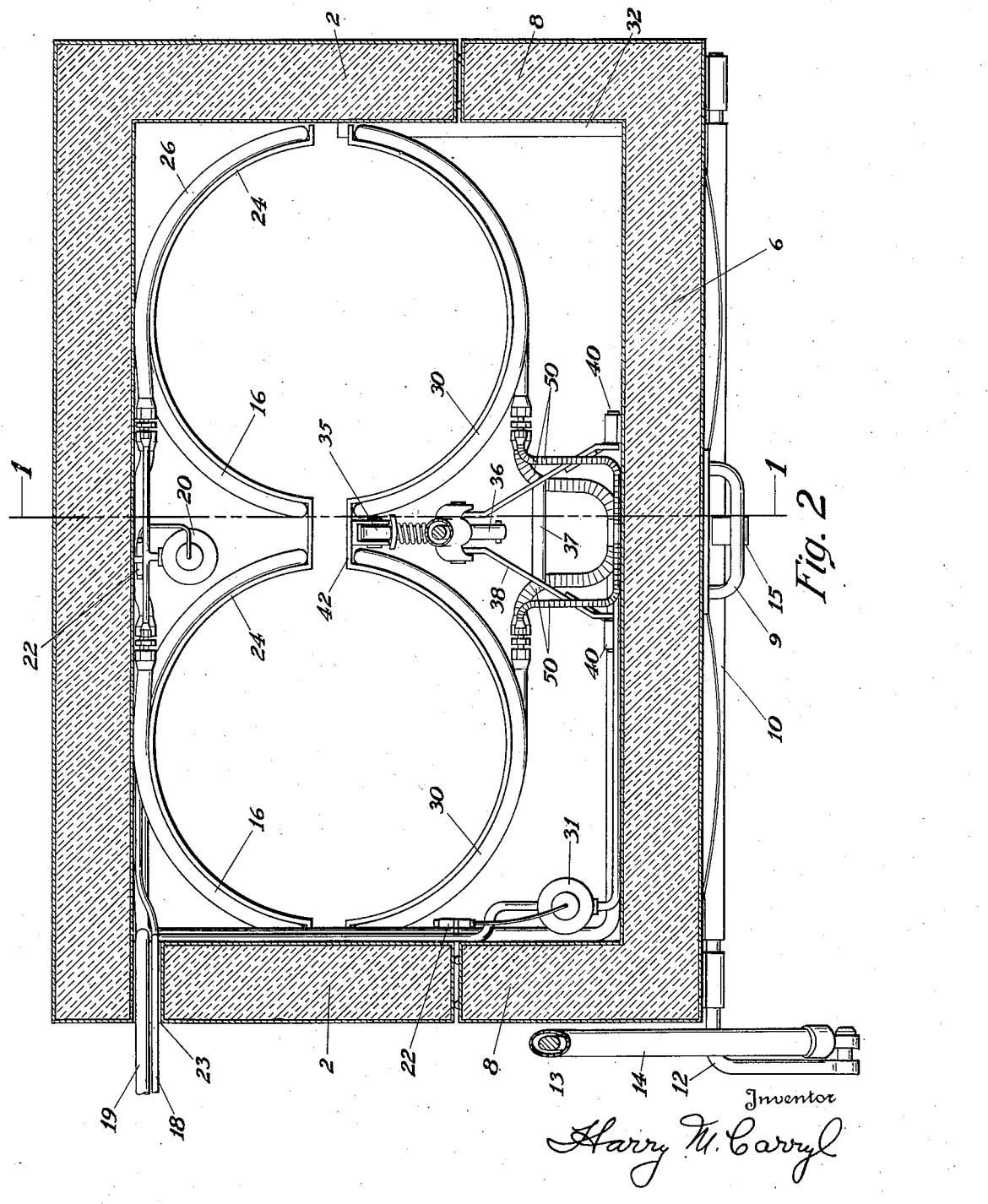
Figure 2 is a top sectional view of Figure 1 taken along line 2—2 in Figure 1.
Figure 5:
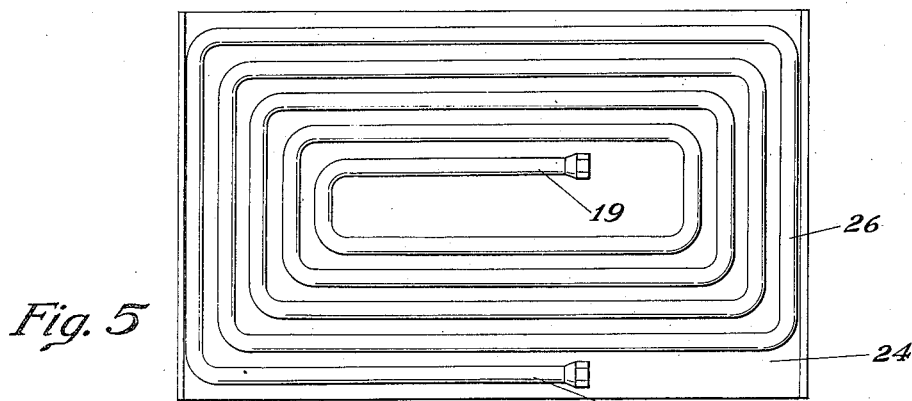
Figure 5 is a developed view of the evaporator showing the arrangement of the cooling tubes in a preferred form of the device.
Figure 6:
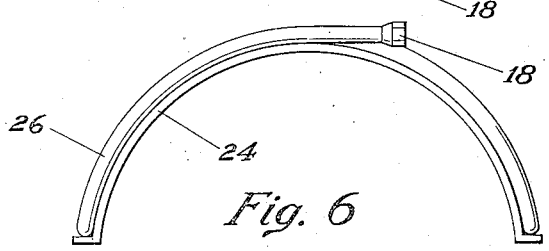
Figure 6 is a top view of a portion of the evaporator showing the inlet tube and relationship of the tubing to the contact surface, outlet tube being concealed by the inlet tube.

The expansion unit 16 is of the conformation generally shown in Figure 2. This unit comprises a contact plate 24, which is adapted to conform to the shape of the body or vessel to be cooled for approximately one-quarter to one-half or more of its area. On the back of this conforming contact plate are mounted evaporator tubes 26 which are attached to the contact plates in a generally spiral shape by any well known attaching process, such as soldering or brazing, as shown in Figures 5 and 6. In the preferred form the spiral is wound with the inlet side on the outside so as to provide better heat absorption distribution on the contact plates.

As many of these evaporator units may be mounted in multiple as are found desirable in any installation. The thermally insulated box 2 will be built of a size according to the number of units to be cooled. The cabinet shown in the drawings is built to accommodate two units.

For purposes of illustration, I have shown my cooling device as applied to a typical milk can 28. As shown in Figure 1, a major portion of the external area of the can 28 is engaged by two sets of contact plates; the stationary plates 24, and the floating plates 30. The evaporator tubes which are attached to the stationary plates 24 are in series with a thermostatically controlled expansion valve 20. The evaporator tubes which are attached to the floating plates 30 are in series with a thermostatically controlled expansion valve 31. The floating contact plates 30 are built similarly to the fixed plates 24 but are mounted to be moved relative to the fixed plates on a rail 32 for reasons to be described later. These movable contact plates are adapted to be resiliently held in engagement with the vessel 28 to be cooled by means of a spring toggle unit, comprised of a spring 34 with rod 36 therethru, and a forked element 38, having a hole at the reduced end to allow the rod 36 to move therethru at the central toggle joint. At the wide end of the arms a suitable pivot is provided on the wall of the chest 2 at 40. The rod 36 is pivoted to a joining diaphragm 42 between the adjoining shaped movable contact plates 30 at a point 35.

To operate this spring toggle is provided an automatic means, consisting of a rod 44 pivoted at 46 to the inside wall of the lid 4, said rod moving into a sleeve 47 attached to the forked element 38 of the toggle. This construction furnishes a lost motion means or telescopic effect which provides for the difference in relative travel between the lid and the center point of the toggle. Suitable springs similar to point 17 are located within the sleeve 47 to cushion the inward and outward movement of the rod 44. A handle 37 attached to forked element 38 may be used for manual operation when it is not desired to have the lid cooperate with the movable cooling contact member 30. On the forked element 38, I mount a triangular plate 48 for a purpose later to be described.

In order to provide for the relative movement between the movable cooling contact members 30 and inlet pipe 18 and exit pipe 19 of the refrigerant, there is provided a section of flexible tubing 50 in each of the refrigerant distributing pipes 18 and 19. As is common practice the inlet pipe of the liquid refrigerant would be smaller than the outlet pipe, and consequently the flexible tubings would be of the same relative sizes as the distributing tubes with which they cooperate.

Figure 7:
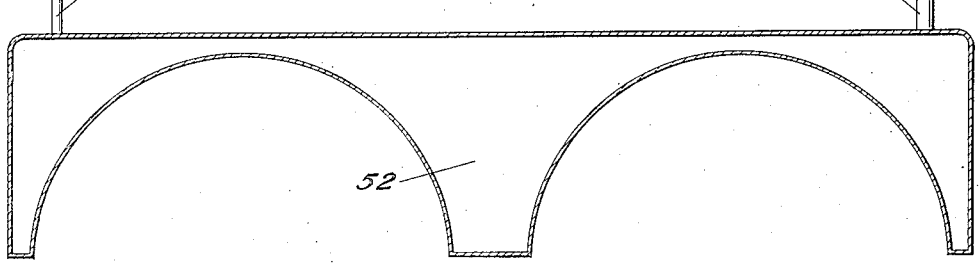
Figure 7 is a top sectional view of another form of my evaporator invention.

At 52 (Figure 7) is shown a modified form of my evaporator cooling plates similar in function to plates 24 and 30, but instead of having expansion tubing 26 mounted on the contact plates 24—30, I use a structure formed by brazing or welding a vessel to conform to the shape shown. At spaced portions on the back of this evaporator unit 52 there are provided enter and exit points such as 54, 56 respectively. This evaporator unit 52 may be used in exactly the same manner as the other type of evaporator units 24—30.

The operation of the device would appear to be apparent from the disclosure in the drawings. If it is found necessary to either cool or freeze the contents of a standard shape metallic milk can, the operator approaches the lid 4 and lifts the handle 9. Lifting the handle 9 by means of the mechanical connection between the pivoted rod 13, the sleeve 14 and the lever arm 12, the apron 10 is moved from the vertical position shown in Figure 1 to the horizontal protecting position shown in Figure 3. At the same time the pivoted rod 44 is also moved by the lid to collapse the toggle 36—38, moving back the movable contact plate 30 relative to the fixed contact plate 24. The operator then may lift his heavy milk can over the low sill 7 and place it within the compartment between the two contact plates 24—30. Thereupon he pulls down the lid 4 which straightens out the toggle and slightly oversets it so the triangular plate 48, which is moved on the forked toggle element 38, bears against the side of the cabinet and prevents the toggle from collapsing toward the bottom of the cabinet; the straining of the toggle forces the movable contact plate in engagement with the side of the milk can as shown in Figure 1. This insures excellent thermal conductivity from the contents of the can to the cooling coils on the back of the contact plates since the conduction from the liquid refrigerant to the contents of the can is totally metal in my preferred form, but, of course, it is to be understood that other solids may be used within the purview of my invention, either for the containers of the substance to be cooled or for the contact plates. At the same time this closure of the lid 4 throws the apron 10 outside the cabinet, as previously described.

It is thought that the invention and numerous of its attendant advantages will be understood from the foregoing description, and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

I claim:

1. A U-shaped cooling unit, another U-shaped cooling unit, means to position said units in conductive relation with an object to be cooled and relative to one another in a manner such that the ends of the legs of the U-shaped members substantially abut one another.

2. A cooling cabinet having a door, an avaporator unit at all times within said cabinet having fixed and movable portions, a device to move the movable portion toward the fixed portion to confine a body therebetween and means controlled by said door to operate said device.

3. A cooling cabinet having walls, a fixed cooling evaporator mounted adjacent one wall of said cabinet, a movable cooling evaporator juxtaposed to said fixed evaporator and capable of movement toward and away from said fixed evaporator, a toggle having its ends attached respectively to a second wall of the cabinet and to a portion of said movable evaporator, means to operate said toggle by movement of a third wall to move the movable evaporator relative to the fixed evaporator.

4. A refrigerator cabinet open at the top, cooling means within the cabinet, means to clasp said cooling means about an object to be cooled, a lid on said cabinet, means to operate said clasping means by said lid.

5. A cooling cabinet with walls and an open top, a fixed cooling evaporator within said cabinet and mounted adjacent the back wall, a rail on each side wall, a movable evaporator mounted to move along said rails, a toggle having a forked pivoted portion and a second pivoted portion, pivoted respectively to the front walls of the cabinet and to the movable evaporator, a cover on said cabinet, a connection between said cover and said toggle for operating the toggle, and resilient means to urge the movable evaporator toward the fixed evaporator when the cover is in closed position.

6. In a cooling device for receiving a cylindrical container, two relatively movable semi-cylindrical contact plates adapted to engage the container in intimate contact, evaporator units attached to the outside of said contact plates, a thermally insulated casing enclosing said contact plates and evaporator units having a low side whose sill is level with the top of the contact plates to protect the plates, and a lid adapted to cover the top of the box and the upper part of the low side.

7. A thermally insulated cabinet of a certain height, an opening in the top of said cabinet, an evaporator unit having a vertical vessel engaging surface, said surface having its top at a height substantially less than the height of said cabinet, a sill constituting a portion of a wall of said cabinet, the edge of said sill being at a height substantially equal to the height of the engaging surface of said evaporator but substantially less than the height of the cabinet so that the lift of heavy objects to the engaging surface will be decreased.

8. A refrigerator cabinet containing an evaporator and having an opening, a sill on one side of said cabinet, a cover for said opening, with a lip for engaging said sill, an element pivoted on said sill and adapted to project within the cabinet when the cover is lifted to protect the sill and the evaporator.

9. A cooling cabinet comprising a thermally insulated cabinet having one side shorter than the opposite side, a cover hinged to the longer side and having a lip extending therefrom a distance equal to the difference in length of the opposite sides of the cabinet, a cooling unit of a generally cylindrical shape and a length substantially equal to the length of the shorter side of the cabinet within the cabinet and a plate for protecting the cooling unit pivoted to the short side of the cabinet and movable by the cover into and out of said cabinet.

10. An evaporator unit including two relatively movable elements shaped to conductively engage the body to be cooled and means to maintain one of the relatively movable elements at a different temperature from the other.

11. A refrigerator cabinet having an opening, a hinged door for the opening, a protecting apron hinged on the exterior edge opposite to that to which the door is hinged, means to tip the apron into the cabinet over the adjacent edge of the cabinet to protect the last named edge from injury.

12. A thermally insulated cabinet, a plurality of evaporator units within the cabinet each unit including a fixed portion to conductively engage a portion of a body to be cooled and a movable portion also shaped to conductively engage another portion of such body to be cooled, and means to maintain a difference in temperature between the fixed and movable portions of the units.

13. A refrigerator cabinet having an opening, an apron having a notched edge, means for mounting said apron on said opening so that said notched edge is within the cabinet and said apron covers a portion of said opening to simultaneously protect the cabinet opening portion and to guide objects into the cabinet.

14. A heat transfer unit for enclosing an object comprising two vertical elements claspingly engaging the object to be cooled, means to maintain the two elements at different temperatures whereby convection within the clasped object will accelerate the rate of heat transfer.

HARRY M. CARRYL.